(No Model.)

J. A. EVARTS.
LAMP CHANDELIER.

No. 256,660. Patented Apr. 18, 1882.

Witnesses:
J. H. Shumway
Jos. C. Earll

John A. Evarts, Inventor
By Atty.

UNITED STATES PATENT OFFICE.

JOHN A. EVARTS, OF MERIDEN, CONNECTICUT, ASSIGNOR TO THE BRADLEY & HUBBARD MANUFACTURING COMPANY, OF SAME PLACE.

LAMP-CHANDELIER.

SPECIFICATION forming part of Letters Patent No. 256,660, dated April 18, 1882.

Application filed January 16, 1882. (No model.)

*To all whom it may concern:*

Be it known that I, JOHN A. EVARTS, of Meriden, in the county of New Haven and State of Connecticut, have invented a new Improvement in Lamp-Chandeliers; and I do hereby declare the following, when taken in connection with accompanying drawings and the letters of reference marked thereon, to be a full, clear, and exact description of the same, and which said drawings constitute part of this specification, and represent, in—

Figure 1:
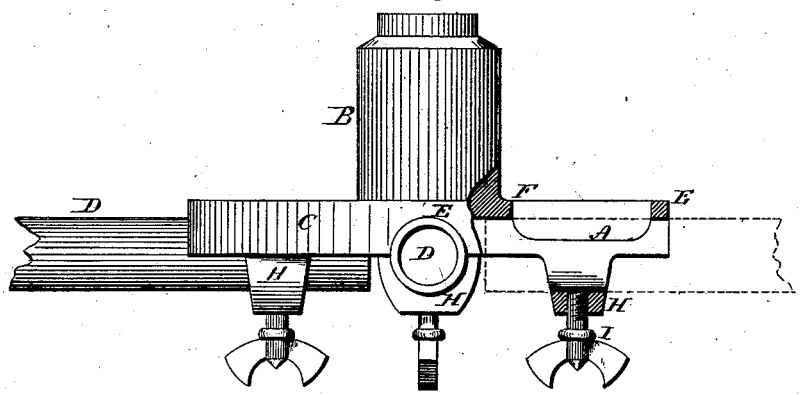
Figure 2:
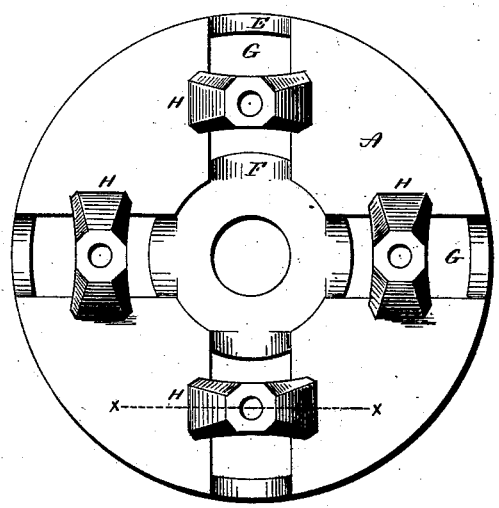
Figure 3:
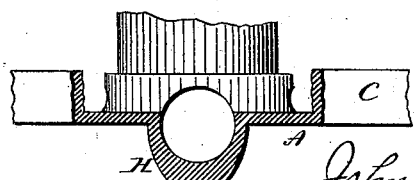

Figure 1, a sectional side view; Fig. 2, an under side view, looking up; Fig. 3, a transverse section on line *x x*.

This invention relates to an improvement in lamp-chandeliers, with special reference to that class which are made adjustable, so that the lamps may be set at different elevations, commonly called "extension-fixtures," but applicable to other fixtures not extensible.

Various devices have been resorted to in the construction of this class of chandeliers as a strong and secure means for securing the arms to the center—as, for instance, a ring has been employed with holes through its rim to receive the ends of or the rods which form the arms inserted through the said holes into a central bearing. Various locking devices of a dovetail character have also been employed; but all require so much fitting as to make the attaching of the arms an expensive part of the fixture.

The object of this invention is to simplify this construction and avoid the labor usually required; and it consists in a plate or disk arranged in the center in a horizontal plane, constructed with two or more seats or bearings for each arm, the said seats for each arm arranged in radial line, with a space between them, leaving an opening through the plate between the seats, and a yoke across said opening formed in the process of casting the plate, and all in one and the same piece or casting, which serves to hold the arm in its seats, as more fully hereinafter described.

A represents the plate or disk, which is in diameter corresponding to the size of the fixture or number of arms which it is to carry, and is constructed with a collar, B, on one side, or otherwise provided with means for attaching it to the central tube or rod. The plate is provided with a flange, C, around its outer edge, extending upward. From the edge of the plate radially inward openings are made corresponding to one-half the arm to be introduced, (here represented as round arms D.) This cuts away the plate entirely, and leaves a bridge, E, across the opening at the flange, and also a like bridge, F, at the center, which two parts E F form bearings or seats for the arm, the opening G in the plate extending from the flange to the center. On the opposite side of the plate, and across these openings, is a bridge, H, presenting upon its upper surface a semicircular shape, which, with the seats E F, substantially complete the circle, or are in substantially the shape of that part of the arm which is to be secured. This bridge being across the opening enables the molding of that together with the rest of the plate without coring, so that the plate may be molded as a whole and cast complete without coring, the sand readily forming its own core through the opening G in the plate to shape the bridge H.

The arm is inserted into the opening in the plate at the outer end beneath the seat E inward over the bridge H, thence inward to the seat F, forming two bearings, F E, on the upper side, and one intermediate seat or bearing, H, on the opposite side.

It is necessary to secure the arm in its place, and this is best done by the insertion of a set-screw, I, through the bridge or bearing H, as seen in Fig. 1; but other devices may be employed. This, however, enables the ready insertion, removal, or adjustment of the arm, and makes a positive and firm security. By this construction the plate is made very strong, is cheaper than the usual construction in that it may be made complete in the process of casting and avoid the usual drilling and fitting required in this part of the fixture.

I have represented the disk as with the two bearings on one side above and the single intermediate bearing on the under side below; but it will be understood that this may be reversed—the two bearings below and the intermediate bearing above.

I claim—

1. The herein-described improvement in lamp-chandeliers, consisting of the disk A, to which the arms are to be secured, constructed with radial openings, having bearings E F at the outer and inner ends of the said opening upon one side, and with the intermediate bridge, H, across the said opening, and forming a bearing upon the opposite side, all formed in casting and in one and the same piece, substantially as described.

2. The herein-described improvement in lamp-chandeliers, consisting of the disk A, to which the arms are to be secured, constructed with radial openings, forming bearings F at the outer and inner ends of the said opening upon one side, and with the intermediate bridge, H, across the said opening, and forming a bearing upon the opposite side, with the set-screw I through the said intermediate bearing, substantially as described.

JOHN A. EVARTS.

Witnesses:
F. J. SEIDENSTICKER,
CHAS. E. SHELLEY.